(No Model.)  2 Sheets—Sheet 1.
A. ROBES.
UNIVERSAL SHAFT COUPLING.
No. 379,030. Patented Mar. 6, 1888.
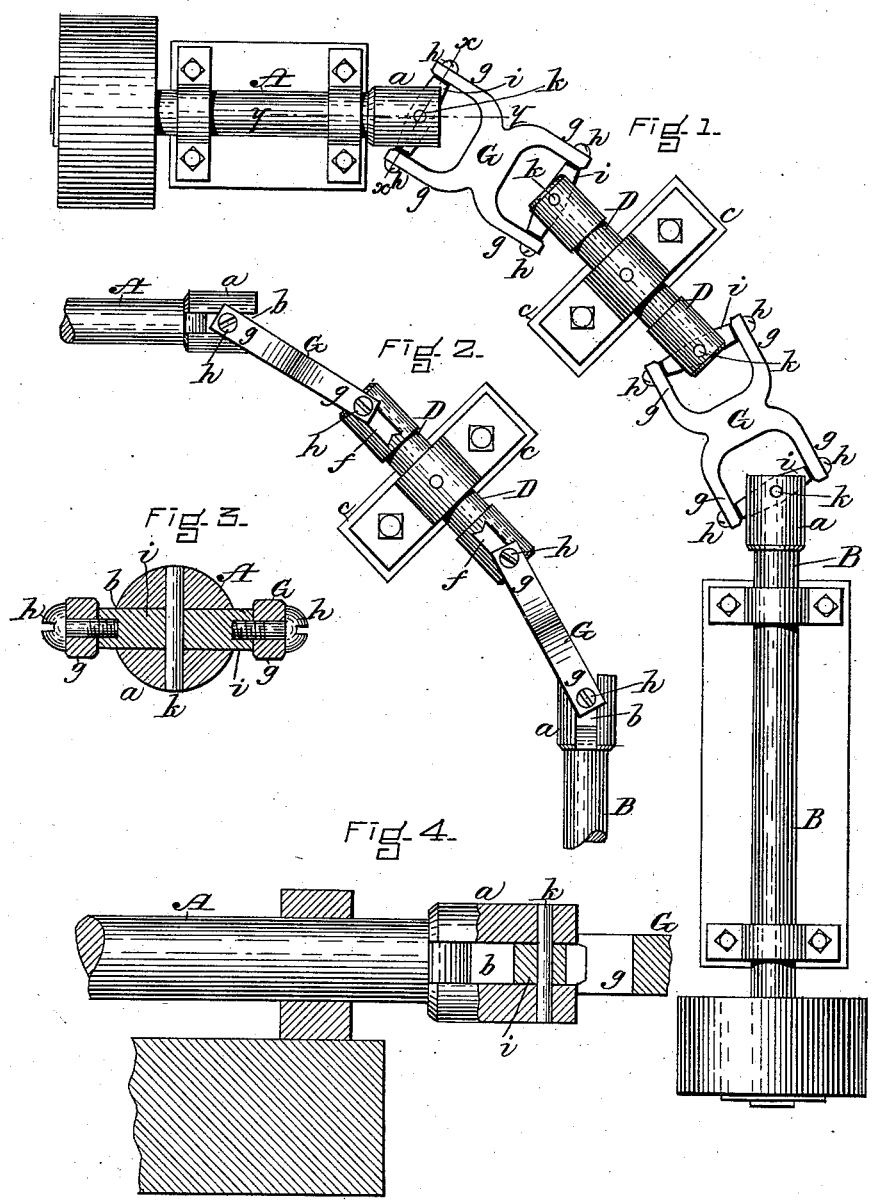
WITNESSES  
Edwin R. Edgett  
F. Vandevere, Hayden
INVENTOR  
Andrew Robes.  
By R. E. Teschemacher  
Atty (No Model.) 2 Sheets—Sheet 2.
A. ROBES.
UNIVERSAL SHAFT COUPLING.
No. 379,030. Patented Mar. 6, 1888.
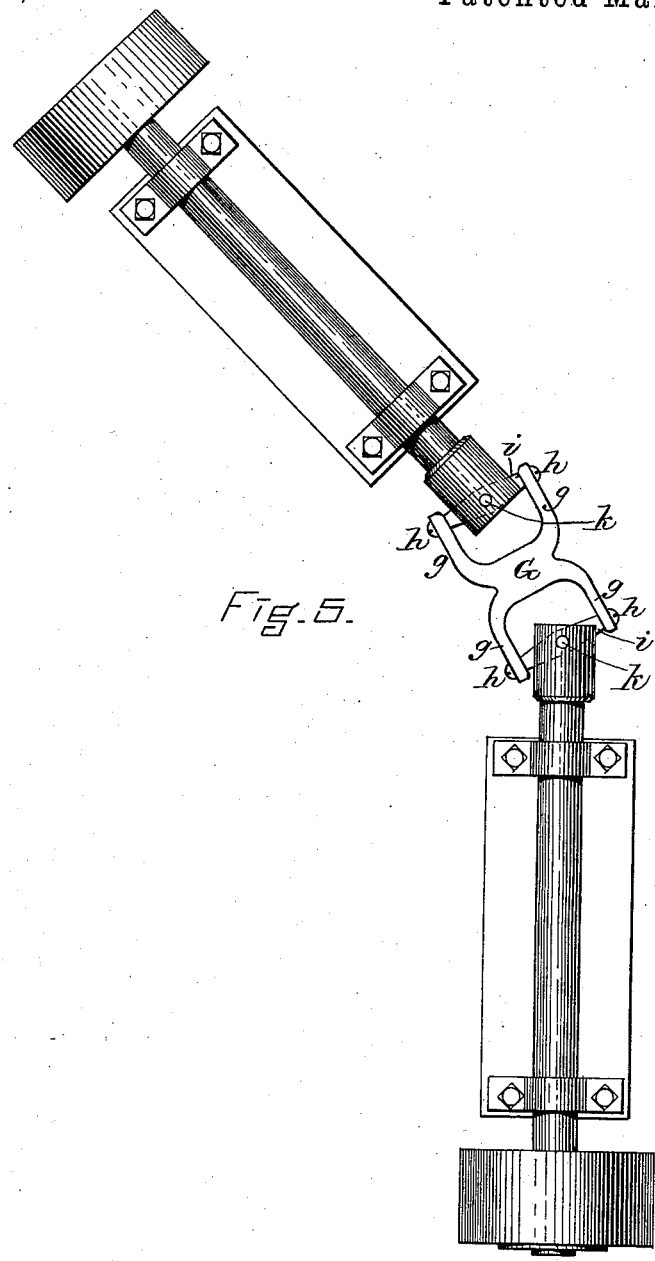

UNITED STATES PATENT OFFICE.

ANDREW ROBES, OF SOMERVILLE, MASSACHUSETTS.

UNIVERSAL SHAFT-COUPLING.

SPECIFICATION forming part of Letters Patent No. 379,030, dated March 6, 1888.

Application filed November 14, 1887. Serial No. 255,175. (No model.)

*To all whom it may concern:*

Be it known that I, ANDREW ROBES, a citizen of the United States, residing at Somerville, in the county of Middlesex and State of Massachusetts, have invented certain Improvements in Universal Shaft-Couplings, of which the following is a full, clear, and exact description, reference being had to the accompanying drawings, making part of this specification, in which—

Figure 1 is a plan representing two shafts placed at right angles to each other and connected by a universal shaft-coupling constructed in accordance with my invention. Fig. 2 is a plan of a portion of the same with the parts in a different position. Fig. 3 is an enlarged vertical section on the line $x$ $x$ of Fig. 1. Fig. 4 is an enlarged vertical section on the line $y$ $y$ of Fig. 1. Fig. 5 is a plan representing two shafts placed at an obtuse angle to each other and connected together by my improved coupling without the employment of an intermediate shaft.

My invention has for its object to provide a universal shaft-coupling of simple construction for connecting shafts placed at a variety of angles or at different levels, or both, and which will be noiseless in its action and will transmit motion steadily from one shaft to another with a perfectly uniform and regular speed without regard to the load, thus avoiding the sudden jerks and irregular motion common to universal shaft-couplings as heretofore constructed, and which have rendered them unsuitable for general purposes.

To this end my invention consists in the combination, with a pair of shafts adapted to run at different angles or levels, or both, and each having a slot at its extremity, of an intermediate connecting-shaft supported in suitable bearings between the ends of the two main shafts and having a slot at each end, and a pair of coupling-links or connecting-pieces bifurcated at each end to form jaws, and arranged one between each of the main shafts and the adjacent end of the intermediate connecting-shaft and coupled with said shafts by a pair of oscillating or rocking bars each pivoted at its center on a pin or bolt within the slotted end of one of the said shafts in line with the axis thereof and having its opposite ends pivoted or journaled within the adjacent jaws of the coupling-link, by which construction and arrangement the power is transmitted from one shaft to the other in a direct axial line and a steady and uniform motion insured under all conditions, as hereinafter more particularly set forth; and my invention also consists in certain combinations of parts and details of construction, as hereinafter set forth and specifically claimed.

In the said drawings, A B represent two main sections or pieces of shafting supported in suitable bearings and arranged at right angles to each other, each shaft carrying at one end a pulley and having its opposite end $a$ provided with an open slot, $b$. Between the two slotted ends $a$ $a$ of the shafts A B, and at an obtuse angle to said shafts, is placed a short intermediate connecting-shaft, D, which runs in suitable bearings on a block or support, $c$, and is provided at each end with an open slot, $f$. Between the slotted end $a$ of each of the shafts A B and the adjacent slotted end of the intermediate connecting-shaft, D, is placed a coupling piece or link, G, of the form shown in Fig. 1, each end being bifurcated to form a pair of jaws, $g$ $g$. Between the outer ends of each pair of jaws $g$ $g$ is pivoted or journaled at its opposite ends by means of screws or pins $h$ $h$ a flat bar, $i$, which is thus free to turn or rock on its longitudinal axis between said jaws $g$ $g$, and the two bars $i$ $i$ of each link or coupling-piece G are placed one within the open slotted end of the main shaft A or B and the other within the adjacent open slotted end of the intermediate connecting-shaft, D, each bar $i$ being pivoted at the center of its length on a pin or bolt, $k$, within the end of the shaft in line with the axis thereof, whereby, as the shafts and coupling-links G are rotated, the bars $i$ $i$ will oscillate on the axial pins $k$ within the slotted ends of the shafts in which they are placed, and thus cause the power to be transmitted from one shaft to another in the direct line of the center of rotation or axis of each shaft, and by the employment of the intermediate shaft, D, in connection with the coupling-links and their oscillating bars $i$ $i$, as described, sharp angles are avoided, and the power is transmitted from one shaft to another with a smooth, easy, and uniform motion, whether the load be more or less, and all jerks or irregularity of motion are thereby avoided—desiderata hitherto unattained in universal shaft-couplings as hitherto constructed.

By thus transmitting the power to or from each shaft through or by means of a single bolt or pin passing transversely through the line of the center of rotation or axis of the said shaft and through the center of the oscillating bar which rocks on said bolt or pin as a center within the slot at the end of the shaft and is pivoted or journaled between the adjacent jaws of the coupling-links, as described, a steady and perfectly regular motion is produced without jar or vibration, thus adapting my improved coupling for general use under all conditions, as it will operate perfectly when the shafts are coupled at different levels and will admit of their being placed at a great variety of different angles.

Where two shafts placed at an obtuse angle to each other are to be connected together the intermediate shaft, D, above described may be dispensed with, in which case only a single coupling-link, G, is required, as seen in Fig. 5, the two bars $i\ i$ of the coupling-link being pivoted within the slotted ends of the two shafts.

What I claim as my invention, and desire to secure by Letters Patent, is—

1. The herein-described universal shaft-coupling, consisting of an intermediate shaft supported in suitable bearings between two main shafts, and a pair of coupling-links or connecting-pieces provided with jaws at their opposite ends and arranged one between the end of each main shaft and the opposite end of the intermediate shaft and connected with the ends of said shafts by means of a pair of oscillating bars, each pivoted at its center within the slotted end of one of the said shafts in line with the axis thereof and having its opposite ends pivoted or journaled within the adjacent jaws of the coupling-link, substantially as and for the purpose set forth.

2. In a universal shaft-coupling, the combination, with a pair of shafts, A B, each having a slot at its end, of an intermediate connecting-shaft, D, supported in suitable bearings between the ends of the shafts A B and having a slot at each end, and a pair of coupling-links or connecting-pieces, G G, bifurcated at each end to form jaws $g\ g$ and arranged one between each of the main shafts and the adjacent end of the intermediate shaft and connected with said shafts by a pair of oscillating bars, $i\ i$, each pivoted at its center on a pin, $k$, within the slotted end of one of the said shafts in line with the axis thereof and having its opposite ends pivoted or journaled within the adjacent jaws of the coupling-link, all operating substantially in the manner and for the purpose described.

3. In a universal shaft-coupling, the combination, with a pair of shafts adapted to run at different angles or levels, or both, and each having a slot at its extremity, of a connecting piece or link, G, having its opposite ends bifurcated to form jaws, and a pair of oscillating bars, $i\ i$, each placed within the slotted end of one of the shafts and pivoted therein at the center of its length directly in line with the axis of the shaft by means of a pin or bolt, $k$, and having its opposite ends pivoted or journaled within the adjacent jaws of the coupling piece or link G, all operating substantially as and for the purpose set forth.

Witness my hand this 12th day of November, A. D. 1887.

ANDREW ROBES.

In presence of—
P. E. TESCHEMACHER,
EDWIN F. EDGETT.